C. A. LAWTON.
FRICTION CLUTCH.
APPLICATION FILED APR. 20, 1914.
1,147,104. Patented July 20, 1915.
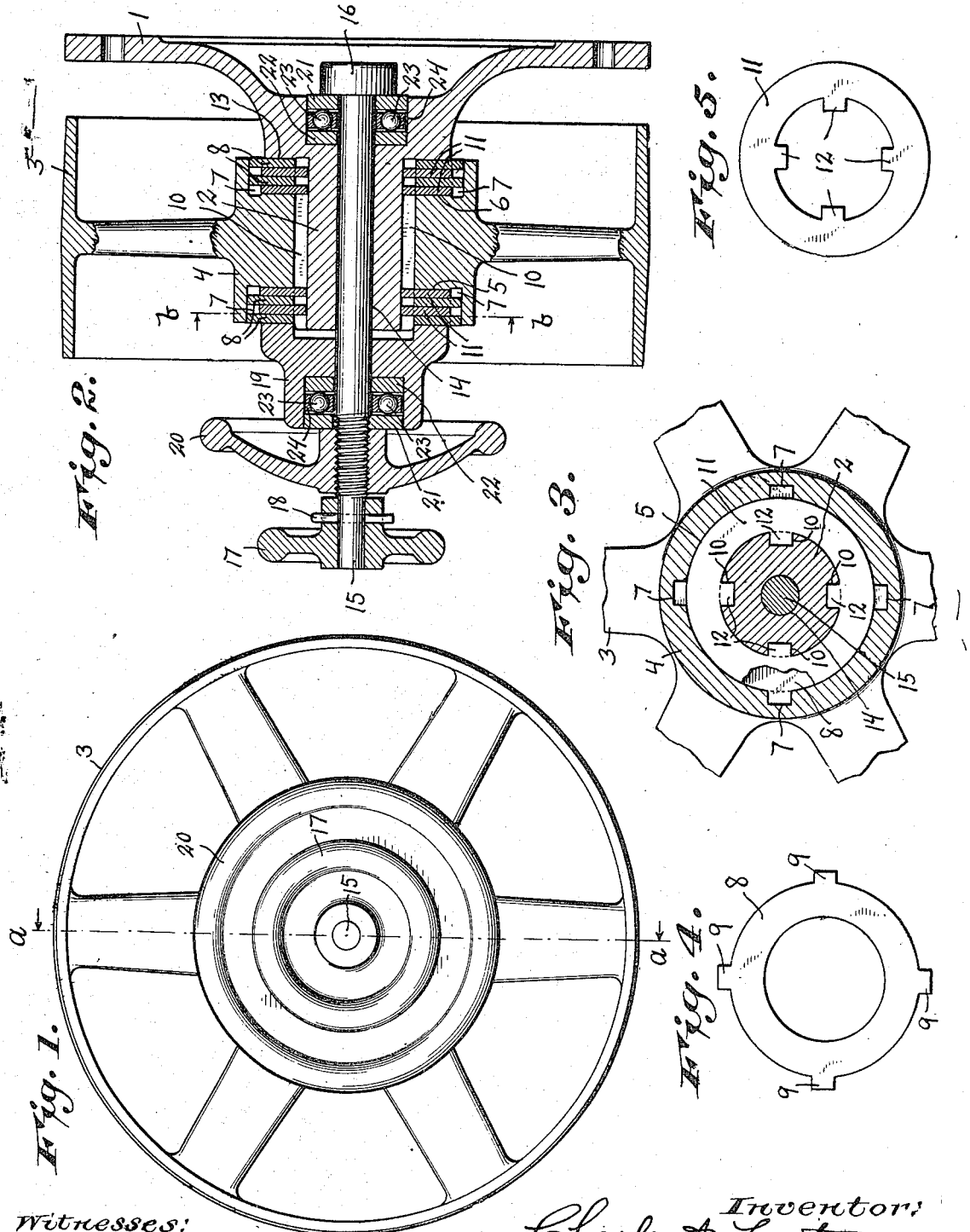
Witnesses:
Fred Palm
Chas. L. Goss.
Inventor:
Charles A. Lawton,
by Flanders, Bottum, Fawcett & Bottum
Attorneys.

UNITED STATES PATENT OFFICE.

CHARLES A. LAWTON, OF DE PERE, WISCONSIN, ASSIGNOR TO THE C. A. LAWTON COMPANY, A CORPORATION OF WISCONSIN.

FRICTION-CLUTCH.

1,147,104.　　　Specification of Letters Patent.　　Patented July 20, 1915.

Application filed April 20, 1914. Serial No. 833,018.

*To all whom it may concern:*

Be it known that I, CHARLES A. LAWTON, a citizen of the United States, residing at De Pere, in the county of Brown and State of Wisconsin, have invented certain new and useful Improvements in Friction-Clutches, of which the following is a specification, reference being had to the accompanying drawing, forming a part thereof.

This invention relates to friction clutches, and the objects of the invention are to improve friction clutches in the manner to be hereinafter described and claimed.

Referring to the drawings which accompany this specification and form a part hereof, on which drawings the same reference characters are used to designate the same elements wherever they may appear in each of the several views, and which drawings illustrate an embodiment of this invention, Figure 1 is an elevation of a pulley with my improved friction clutch applied thereto; Fig. 2 is a vertical section taken on the line a—a, on Fig. 1, looking in the direction indicated by the arrows; Fig. 3 is a vertical section taken on the line b—b, on Fig. 2, looking in the direction indicated by the arrows; Fig. 4 is an elevation of a friction ring; and Fig. 5 is an elevation of a coacting friction ring.

Referring to the drawings, the reference numeral 1 designates a disk or spider adapted to be secured to a shaft, pulley or the like, and provided with a hub 2, upon which is supported a belt pulley 3, for example, though it will of course be understood that a belt pulley has been selected as merely illustrative of the application of the invention, and this belt pulley will be hereinafter referred to as a power transmitting member. The power transmitting member is intended to remain stationary while the hub 2 is being revolved, or to revolve therewith if the disk 1 and hub 2 are the driving members, or if the power transmitting member is the driving member, the power transmitting member is intended to revolve independently of the hub 2, or to revolve therewith, according to the action of the clutching mechanism. The power transmitting member is provided with a hub 4, which is preferably provided with recesses at each end to receive the necessary number of friction rings to transmit the power contemplated. The hub 4 is provided with slots extending longitudinally thereof and opening into the recesses aforesaid, and, in the construction illustrated by the drawings, there are four of these slots for each of the two recesses. The two recesses are designated by the reference numerals 5 and 6, and the slots hereinbefore referred to are all designated by the reference numeral 7. Friction rings 8 are provided, of a size to fit readily in the recesses in hub 4, and their internal diameters are slightly larger than the diameter of the hub 2, and they are provided with projections 9, adapted to be received in the slots 7 in the hub 4. The hub 2 is provided with longitudinal slots 10, which in the construction illustrated, are four in number, and friction rings 11 are provided, the external diameters of which are slightly less than the diameters of the recesses 5 and 6, and the internal diameters of which are sufficiently large to enable them to be readily slipped onto hub 2. These friction rings 11 are provided with internal projections 12, adapted to be received within the slots 10 in hub 4. The disk or spider 1 is provided with a shoulder 13, which forms one abutment for the friction rings. The hub 2 is provided with a bore 14 therethrough, within which is received the screwthreaded bolt 15. This bolt 15 has a head 16 on one end, and a button or hand wheel 17, secured to its opposite end in any suitable manner, as for example, by the pin 18. A clamp 19, which is freely movable upon the bolt 15, is adapted to bear against the outermost friction ring in one recess in the hub 2, and force the friction rings against each other and into tight contact with the shoulder 13 and the inner ends of the recesses 5 and 6, when pressure is applied thereto by the clamping nut 20, in a manner which will be readily understood from an inspection of Fig. 2 of the drawings.

In order that the clutch may be used with a minimum expenditure of energy, anti-friction devices are interposed between the clamping nut 20 and the clamp 19, and between the hub 2 and the head 16 of the bolt 15. The drawings illustrate simple and efficient anti-friction devices for the purpose stated, each consisting of ball tracks 21 and 22, balls 23, and a ball cage 24, these parts being assembled in recesses in the hub 2 or disk 1, and the clamp 19 respectively.

The operation of the apparatus is as follows: If the power transmitting member is unclutched from the hub 2, the button or hand wheel 17 is held from turning while the clamping nut 20 is revolved to screw the clamping nut toward the head 16 on the bolt 15, to clamp the parts tight together in a manner which will be readily understood. If now it is desired to unclutch the power transmitting member from the hub 2, the button or hand wheel 17 is kept from turning while the clamping nut 20 is unscrewed toward it.

By the use of the anti-friction members the parts can be clamped very tightly together by means of the bolt 15 and clamping nut 20, while at the same time the clamping nut 20 can be readily released and unscrewed when it is desired to unclutch the power transmitting member from the hub 2.

I prefer to assemble the friction rings in the recesses 5 and 6 and on the hub 2, by alternating a friction ring 8 with a friction ring 11, as clearly illustrated by Figs. 2 and 3 of the drawings.

What is claimed is:

The combination with a hub provided with a shoulder on the exterior thereof and a recess adapted to receive the head of a bolt and also provided with a bore for said bolt, of a power transmitting member on said hub, friction rings engaged alternately with the power transmitting member and the hub, a screwthreaded bolt passing through the bore in the hub aforesaid with the head of the bolt engaged in the recess aforesaid, a clamping nut on the bolt exterior of the hub adapted to be turned manually, a clamp carried by said bolt and adapted to press the friction rings into contact with each other by relative rotation between the bolt and the clamping nut, a hand wheel on the bolt, and anti-friction devices located respectively between the head of the bolt and the hub and between the clamping nut and the clamp carried by the bolt.

In witness whereof I hereto affix my signature in presence of two witnesses.

CHARLES A. LAWTON.

Witnesses:
 WILLIAM W. BOWRING,
 WM. R. DAMMERS.